United States Patent
Wagner

(10) Patent No.: US 11,490,174 B2
(45) Date of Patent: Nov. 1, 2022

(54) COMMUNICATION SYSTEM FOR AUTOMATION AND PROCESS ENGINEERING, AND Y SELECTOR SWITCH UNIT FOR SUCH A COMMUNICATION SYSTEM

(71) Applicant: IFM ELECTRONIC GMBH, Essen (DE)

(72) Inventor: Alfred Wagner, Bodnegg (DE)

(73) Assignee: IFM ELECTRONIC GMBH, Essen (DE)

( * ) Notice: Subject to any disclaimer, the term of this patent is extended or adjusted under 35 U.S.C. 154(b) by 290 days.

(21) Appl. No.: 16/757,472

(22) PCT Filed: Nov. 6, 2018

(86) PCT No.: PCT/EP2018/080311
§ 371 (c)(1),
(2) Date: Apr. 20, 2020

(87) PCT Pub. No.: WO2019/096629
PCT Pub. Date: May 23, 2019

(65) Prior Publication Data
US 2021/0195302 A1    Jun. 24, 2021

(30) Foreign Application Priority Data
Nov. 17, 2017 (DE) ...................... 10 2017 127 075.2

(51) Int. Cl.
*H04Q 3/64* (2006.01)
*G06F 13/38* (2006.01)
(Continued)

(52) U.S. Cl.
CPC ............ *H04Q 3/645* (2013.01); *G05B 19/00* (2013.01); *G06F 13/382* (2013.01);
(Continued)

(58) Field of Classification Search
CPC ..... H04L 67/12; H04L 12/2803; H04Q 3/645; H04Q 2201/802; G05B 19/00;
(Continued)

(56) References Cited

U.S. PATENT DOCUMENTS 6,201,533 B1 * 3/2001 Rosenberg ............. G01B 5/008
345/184
7,269,096 B2 * 9/2007 Millikin .................... G01S 5/28
367/127

(Continued)

FOREIGN PATENT DOCUMENTS

DE      202010002129 U1    6/2010
DE      102014114750 A1   12/2015
(Continued)

*Primary Examiner* — Faisal M Zaman
(74) *Attorney, Agent, or Firm* — Leason Ellis LLP

(57) ABSTRACT

The invention relates to a communication system for automation and process engineering, having a controller (2) as a data receiver and a sensor (3) as a data source, which use a communication line to exchange digital data as voltage signals based on the IO-Link standard. In order to allow the user to be able to access the data of a sensor that is in the communication system in a simple manner, the communication line is divided into two line sections, and a Y selector switch unit (10) is used at the junction, wherein the Y selector switch unit (10) is provided with a first connection (10a) on the sensor side and with a second and a third connection (10b, 10c) on the controller side, wherein the second connection (10b) has the controller (2) connected to it and the third connection (10c) has a further data receiver (4) connected to it, and wherein the Y selector switch unit (10) comprises a microcontroller (11) in which the sensor (3) is simulated by means of software so that the further data receiver (4) can query data of the sensor (3) without having to directly access or engage with the sensor (3) or the communication thereof with the controller (2).

6 Claims, 1 Drawing Sheet

Figure 1:
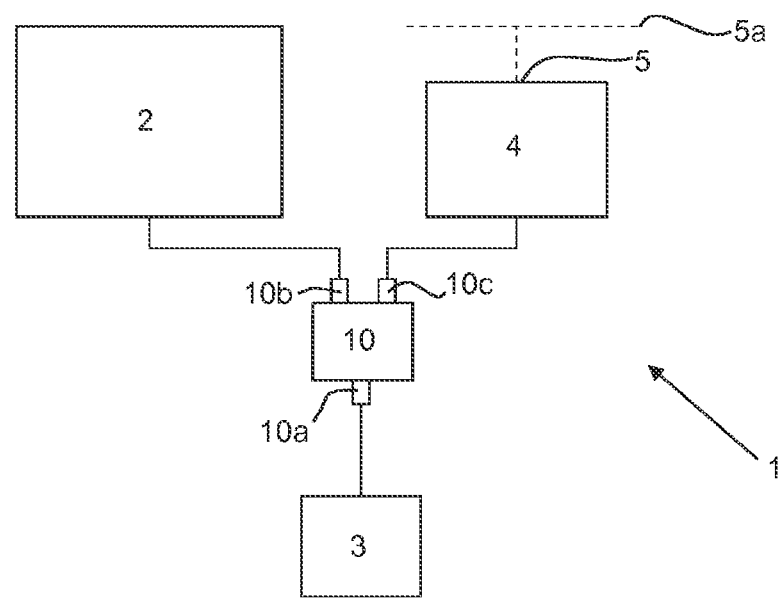

(51) Int. Cl.
*G05B 19/00* (2006.01)
*G06F 13/40* (2006.01)
*H04L 67/12* (2022.01)

(52) U.S. Cl.
CPC .......... *G06F 13/4022* (2013.01); *H04L 67/12* (2013.01); *H04Q 2201/802* (2013.01)

(58) Field of Classification Search
CPC ............... G05B 19/4186; G06F 13/382; G06F 13/4022; Y02P 90/02
See application file for complete search history.

(56) References Cited

U.S. PATENT DOCUMENTS

| | | | | |
|---|---|---|---|---|
| 2003/0120367 A1* | 6/2003 | Chang | ................ | G05B 23/0235 381/56 |
| 2003/0159077 A1* | 8/2003 | Matsuo | ................ | G06F 1/3203 713/300 |
| 2005/0034039 A1* | 2/2005 | Prasadh | .............. | G06F 11/2236 714/E11.166 |
| 2010/0114334 A1* | 5/2010 | Krumsiek | ........... | G05B 19/042 700/3 |
| 2012/0110225 A1* | 5/2012 | Wessling | ................ | G04G 7/00 710/61 |
| 2012/0174174 A1* | 7/2012 | Ozawa | .................. | H04L 65/104 725/110 |
| 2013/0336092 A1* | 12/2013 | Pennec | ..................... | G01V 1/22 367/76 |
| 2014/0207982 A1* | 7/2014 | Graff | ................. | H04L 12/40006 710/69 |
| 2015/0095711 A1* | 4/2015 | Elend | ..................... | G06F 11/261 714/39 |
| 2015/0331827 A1* | 11/2015 | Beyer | ................... | G06F 13/423 710/61 |
| 2016/0054786 A1* | 2/2016 | Chenault | ............. | G06F 13/4022 710/313 |
| 2016/0182341 A1* | 6/2016 | Fischer | ................... | H04L 12/66 370/251 |
| 2018/0088563 A1* | 3/2018 | Gutekunst | .......... | G05B 19/0423 |
| 2018/0356786 A1* | 12/2018 | Ozaki | .................... | G05B 19/05 |

FOREIGN PATENT DOCUMENTS

| | | |
|---|---|---|
| DE | 102016217706 A1 | 3/2017 |
| DE | 102015223089 A1 | 5/2017 |
| EP | 3220225 A1 | 9/2017 |
| WO | 2013178209 A1 | 12/2013 |
| WO | 2015161915 A1 | 10/2015 |

* cited by examiner

COMMUNICATION SYSTEM FOR AUTOMATION AND PROCESS ENGINEERING, AND Y SELECTOR SWITCH UNIT FOR SUCH A COMMUNICATION SYSTEM

CROSS-REFERENCE TO RELATED PATENT APPLICATIONS

This application is a U.S. National Stage Application under 35 U.S.C. § 371 of International Patent Application No. PCT/EP2018/080311, filed Nov. 6, 2018, which claims the benefit of priority of German Patent Application number DE 10 2017 127 075.2 filed Nov. 17, 2017, both of which are incorporated by reference in their entireties. The International Application was published on May 23, 2019, as International Publication No. WO WO 2019/096629 A1.

The invention relates to a communication system for automation engineering according to the preamble of claim 1 as well as a Y selector switch unit for such a communication system according to the preamble of claim 6.

Sensors and/or measuring devices are often used in automation and process engineering that convert the measured variable, for example the pressure, temperature, flow but also the distance or vibration, into an output signal representing this measured variable in the form of an analog or digital current or voltage signal and offer this signal at their cable or plug connection, but sometimes also wirelessly, to a superordinate control unit such as a SPS (also known as a programmable logic controller (PLC)) for further processing. The SPS is also referred to as a "control unit."

A typical measuring device is comprised first and foremost of a sensor element, also referred to as a measurement transducer, which records and converts a physical variable of a process value into a measurement signal. It also includes an evaluation unit, which is often a micro-controller (control unit) in which the measurement signals generated by the sensor element are formatted, i.e., amplified and often processed as well. At the output, the evaluation unit is connected with a communication interface by means of which the formatted measurement signals can be transmitted to the control unit referenced above.

In addition, automation engineering is familiar with the use of a standard communication interface driver that corresponds to the IO-Link standard. The IO-Link standard is a special communication system in industrial automation that is used to link intelligent sensors and actuators, which are also referred to as field devices, to the control unit. The IO-Link standard is specified in the standard IEC 61131-9 under the title "single-drop digital communication interface for small sensors and actuators" (SDCI). The standardization comprises both the electric connection data and a digital communication protocol by means of which the sensors and actuators exchange data with the control unit.

Over the course of generally advancing digitalization, an increased need has arisen to gain access to the data of the sensor as well as the communication data exchanged between the sensor and the control unit to monitor or analyze individual data outside of the control as well. This process is associated with a significant degree of effort; however, the system operator is sometimes even forbidden from subsequently interfering with the communication system set up between the control and the sensor.

The object of the invention is to further develop a communication system for automation and process engineering in such a way that that the user is able to access the data from a sensor in the communication system in a simple manner.

According to the invention, the object is achieved with a communication system with the features of claim 1 as well as a Y selector switch unit for such a communication system with the features of claim 6. Preferred embodiments of the invention are provided in the subclaims.

According to the invention, the communication line through which the control as the data receiver and a sensor as the data source exchange digital data as voltage signals based on the IO-Link standard is divided into two line sections, and a Y selector switch unit is used at the junction. The term 'Y selector switch unit' is used due to the fact that a first connection is provided on the sensor side and a second and a third connection are provided on the controller side. The Y selector switch unit furthermore comprises a microcontroller, in which the sensor is simulated by means of software, so that the further data receiver can query data of the sensor without having to direct access or engage with the sensor or the communication thereof with the controller. What matters therefore is that the signals from the first connection to the second connection, i.e., from the sensor to the controller are directly transmitted in the Y selector switch unit without any changes, i.e., that they are basically passed through while the connection between the first and the third connection is characterized by the fact that the signals are transmitted here in the T selector switch unit via the microcontroller.

Ultimately, therefore, both the controller and the further data receiver "see" the sensor independently from each other, which creates a digital twin. The possibility is therefore provided to virtually copy or imitate the sensor outside of the actual connection between the sensor and the controller to allow access to its data without unduly influencing the communication with the controller.

Different from the controller, which has read and write access to the sensor, the further data receiver can only read the sensor data. A firewall and therefore a high degree of security is thus achieved because any interference with the controller network is prevented while, at the same time, it is possible to access the sensor data outside of the controller network.

One advantageous embodiment of the invention provides that the further data receiver comprises an interface for a connection with the corporate network and/or a portable data processing device (tablet, Smartphone, laptop, etc.). The connection may be hardwired, for example by using a LAN or USB, but also wireless, for example by using Bluetooth or WLAN. This makes it possible to read and further process the sensor data from the data receiver. The sensor data is then available—independently from each other—both in the controller network and in a traditional corporate network and/or on mobile data processing devices in spite of an often required strict separation of these two networks.

Another preferred embodiment of the invention provides that all three connections are configured identically, i.e., that all three connections have at least one pin for the IO-Link signals, one pin for analog signals and two pins each for the voltage supply and can be contacted via identical plugs.

Below, the invention is explained in further detail on the basis of exemplary embodiments and with references to the drawings.

Figure 2:
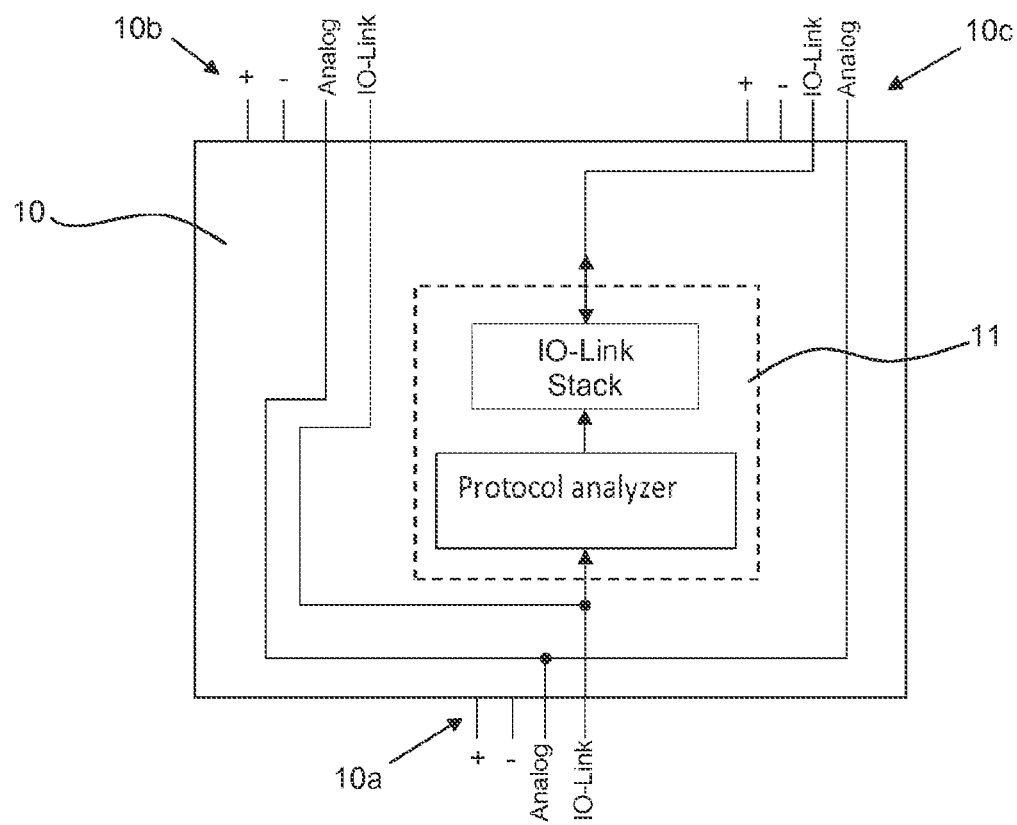

FIG. 1 shows a communication system according to the invention for automation and process engineering and FIG. 2 shows a block diagram of a Y selector switch unit according to the invention.

In the description of the preferred embodiment, the same reference signs refer to the same or comparable components.

FIG. 1 shows a diagram of a communication system 1 for automation and process engineering according to the invention. It focuses on a Y selector switch unit 10 with three connections 10a, 10b, 10c, wherein a first connection 10a is arranged on the sensor side, and the other two connections 10b, 10c are arranged on the controller side.

A sensor 3 is connected to the first connection 10a. It may be any kind of sensor or measuring device that may be customary for automation and process engineering, in particular a pressure, temperature, flow or fill level sensor. What matters is that it is an intelligent sensor suitable for exchanging digital data with a controller ("control unit") such as an SPS (i.e., Programmable Logic Controller) based on the IO-Link standard. In addition to the pure measurement data, this refers, in particular, to all data that characterizes the sensor itself such as a serial number, an ID, and diagnostic or parameter data.

The sensor 3 is connected to the control unit 2 directly and indirectly by means of a communication line. When a user, however, wants to access the data of the sensor 3 or communication data exchanged between the sensor 3 and the controller 2 for monitoring or evaluation purposes, said user is limited by the options offered by the controller. By using the Y selector switch unit 10 between the sensor 3 and the control unit 2, the required direct connection is not impaired or interrupted. It does, however, allow the user to access the desired data from a further data receiver 4 without influencing this direct connection and therefore in a permissible manner. The control unit 2 is connected to the second connection 10b, and the further data receiver 4 is connected to the third connection 10c of the Y selector switch unit 10. It is conceivable to configure the connection between the Y selector switch unit 10 and the further data receiver 4 wirelessly as well, which provides a high degree of flexibility.

The data receiver 4 optionally, which is why it is indicated with a dotted line, comprises an interface 5 for a connection with a corporate network 5a and/or a portable data processing device (tablet, Smartphone, laptop, etc.). The connection may be hardwired, for example by using LAN, USB, or wireless, for example by using Bluetooth or WLAN. This makes it possible to read and further process the sensor data from the data receiver 4. Then, the sensor data is available independently from each other both in the controller network as well as the traditional corporate network 5a and/or on mobile data processing devices.

FIG. 2 shows the Y selector switch unit 10 in detail in the form of a block diagram. The three connections 10a, 10b, 10c each comprise four pins, wherein "+" and "−" designate the positive or negative operating voltage. So as not to make the figure too complicated, the explicit wiring of these pins is not shown, and the connection options are only indicated. There is furthermore one pin each for accessing the recorded measurement variables, here in the exemplary form of an analog signal, as well as one pin by means of which digital signals are transmitted based on the IO-Link standard. Preferably, all three connections are configured identically, i.e., identical plugs can be used for all three connections.

FIG. 2 shows that both the line for the analog signal and the link for the IO-Link signal are divided behind the first connection 10a and guided directly to the second connection 10b to which the control unit 2 is connected as well as to the third connection 10c to which the further data receiver 4 is connected. The IO-Link signal is first, however, transmitted to a microcontroller 11, which comprises a protocol analyzer as well as an IO-Link stack. Here, the software sensor 3 is simulated by means of software, i.e., virtually.

This virtual simulation is carried out in this way: the sensor data arriving at the first connection 10a is examined by a protocol analyzer as to whether it is data from the IO-Link protocol. The most important data for the virtual simulation is exchanged between the control unit 2 and the sensor 3 during the run-up phase. In the event the run-up phase cannot be recorded, the device description of the sensor 3, also referred to as IODD, may alternatively be transferred to the microcontroller 11. What is special about this is that this is not just a device stack or a master stack. Consequently, principal authorizations such as the write authorization are defined. Since the ability to have write access to the sensor 3 is exclusively reserved for a master stack, this already creates a firewall function and prevents access to the sensor 3 from the perspective of the data receiver 4. Furthermore, the firewall function is amplified because the write access to the sensor 3 is prevented in the protocol analyzer by software as well.

The invention claimed is:

1. A communication system for automation and process engineering comprising:
   a programmable logic controller used as a control unit (2) as a data receiver
   a sensor (3) as a data source, which uses a communication line to exchange digital data as voltage signals based on the IO-Link standard; and
   a Y selector switch unit (10) at which the communication line is divided into two line sections,
   wherein the Y selector switch unit (10) is provided with a first connection (10a) on the sensor side and with a second and third connection (10b, 10c) on the control unit side, wherein the second connection (10b) has the control unit (2) connected to it, and the third connection (10c) has a further data receiver (4) connected to it, and wherein the Y selector switch unit (10) comprises a microcontroller (11) in which the sensor (3) is simulated by means of software so that the further data receiver (4) can query data of the sensor (3) without having to directly access or engage with the sensor (3) or the communication thereof with the control unit (2), and wherein signals from the first connection (10a) to the second connection (10b) are directly transmitted in the Y selector switch unit (10) without any changes while signals between the first connection (10a) and the third connection (10c) are transmitted in the Y selector switch unit (10) via the microcontroller (11).

2. The communication system according to claim 1, wherein the microcontroller (11) comprises a protocol analyzer as well as a protocol stack based on the IO-Link standard.

3. The communication system according to claim 2, wherein the protocol stack is configured as a device stack which generally does not permit any write access.

4. The communication system according to claim 1, wherein the further data receiver (4) comprises an interface (5) for connecting with a corporate network (5a) and/or a portable data processing device.

5. The communication system according to claim 1, wherein all three connections (10a, 10b, 10c) are configured identically.

6. A Y selector switch unit for a communication system for automation and process engineering comprising:
   a programmable logic controller used as a control unit (2) as a data receiver and a sensor (3) as a data source,
   wherein digital data is transmitted as voltage signals between the control unit (2) and the sensor (3) based on the IO-Link standard in a communication line, wherein:
a first connection (10*a*) is provided on the sensor side, and a second and third connection (10*b*, 10*c*) are provided on the control unit side, wherein the second connection (10*b*) is provided for connecting to the control unit (2), and the third connection (10*c*) is provided for connecting to a further data receiver (4), wherein the Y selector switch unit (10) comprises a microcontroller (11) in which the sensor (3) is simulated by means of software so that the further data receiver (4) can query data of the sensor (3) without having to directly access or engage with the sensor (3) or the communication thereof with the control unit (2), and wherein signals from the first connection (10*a*) to the second connection (10*b*) are directly transmitted in the Y selector switch unit (10) without any changes while signals between the first connection (10*a*) and the third connection (10*c*) are transmitted in the Y selector switch unit (10) via the microcontroller (11).

\* \* \* \* \*